United States Patent [19]

Tanaka et al.

[11] Patent Number: 4,655,929

[45] Date of Patent: Apr. 7, 1987

[54] PROCESS FOR PROCESSING WASTE SOLUTION CONTAINING AMMONIUM IONS AND FLUORIDE IONS

[75] Inventors: Hiroshi Tanaka, Saitama; Toshiaki Kikuchi, Tokyo, both of Japan

[73] Assignee: Mitsubishi Kinzoku Kabushiki Kaisha, Tokyo, Japan

[21] Appl. No.: 718,373

[22] Filed: Apr. 1, 1985

[30] Foreign Application Priority Data

Apr. 5, 1984 [JP] Japan .................. 59-066751

[51] Int. Cl.$^4$ ............................. C02F 1/04; C02F 1/42
[52] U.S. Cl. .................................... 210/664; 210/677; 210/681
[58] Field of Search .............. 210/664, 670, 677, 681, 210/682, 685

[56] References Cited

U.S. PATENT DOCUMENTS

| | | | |
|---|---|---|---|
| 3,475,330 | 10/1969 | Gilles | 210/685 |
| 3,870,033 | 3/1975 | Faylor et al. | 210/664 |
| 4,234,419 | 11/1980 | Coillet | 210/664 |

Primary Examiner—Ivars Cintins
Attorney, Agent, or Firm—Oblon, Fisher, Spivak, McClelland & Maier

[57] ABSTRACT

In a process for processing a waste solution containing ammonium ions and fluoride ions to recover ammoniacal water and anhydrous hydrogen fluoride, the waste solution is treated with a strong acid type ion exchange resin to separate ammonium ions; the resin is eluted with hydrochloric acid to recover ammonia as ammonium chloride; the effluent is distilled with addition of concentrated sulfuric acid to recover hydrogen fluoride; the remaining diluted sulfuric acid is concentrated and recycled to the hydrogen fluoride recovery step; the ammonium chloride solution is distilled with addition of magnesium hydroxide to recover ammonia water; the remaining formed magnesium chloride is thermally decomposed into hydrochloric acid and magnesium hydroxide, which are recycled to the regeneration of the ion exchange resin and the treatment of the ammonium chloride solution respectively.

4 Claims, 1 Drawing Figure

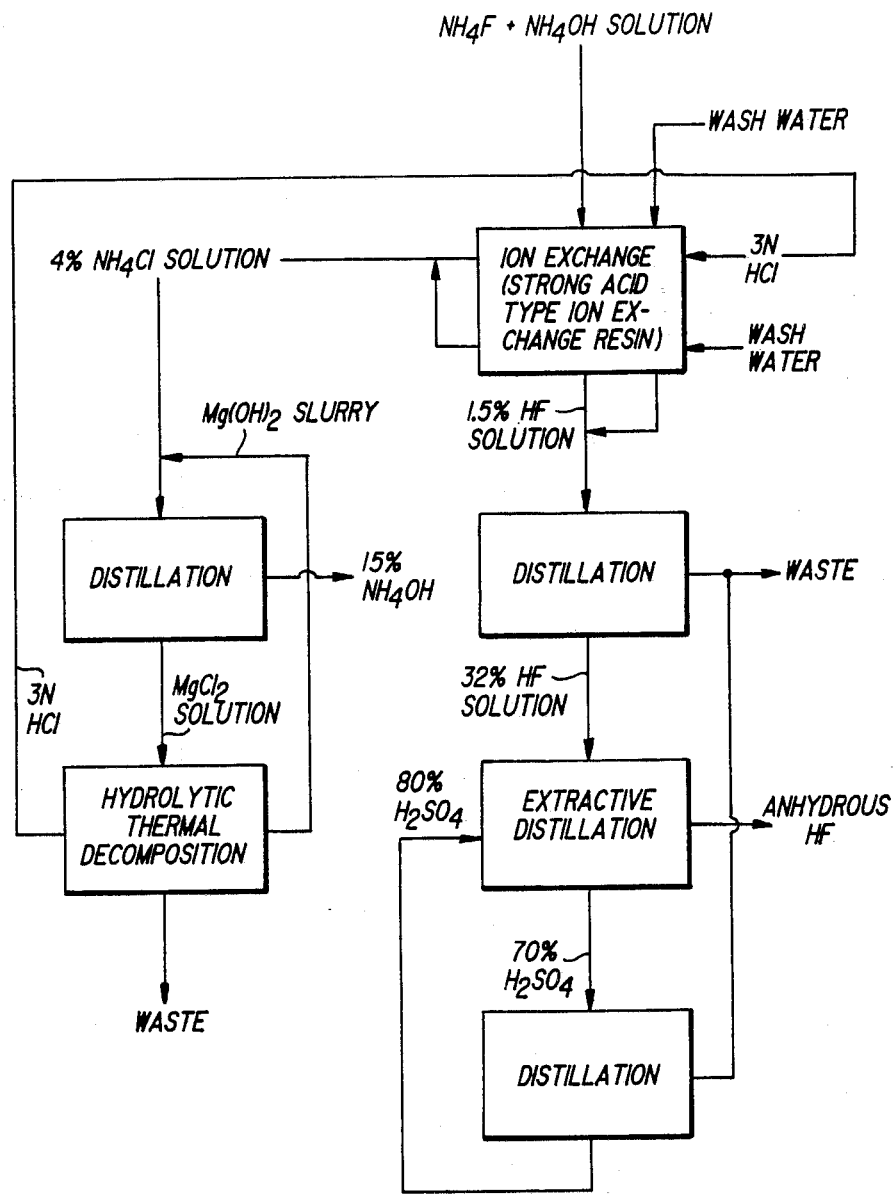

PROCESS FOR PROCESSING WASTE SOLUTION CONTAINING AMMONIUM IONS AND FLUORIDE IONS

FIELD OF THE INVENTION

This invention primarily relates to a process for processing a waste solution containing ammonium ions and fluoride ions from the production of uranium nuclear fuel including recovery and recycled use of anhydrous hydrogen fluoride (hydrofluoric acid) and ammonia.

BACKGROUND OF THE INVENTION

Uranium dioxide, which is a typical nuclear fuel material, is produced from uranium hexafluoride in a uranium nuclear fuel production plant. At the step where the intermediate produce ammonium diuranate is produced, a solution containing ammonium ions and fluoride ions is produced as a waste. Today this waste solution is treated with calcium hydroxide to cause separation into ammonia water and calcium fluoride in the uranium nuclear fuel production plant, and only ammonia water is recycled to the production of nuclear fuel material.

The calcium fluoride is simply stored and accumulated in the nuclear fuel production plant, since no way has been found for direct use of this material in the plant. Outside of the nuclear fuel production plant, calcium fluoride will be a starting material for the production of anhydrous hydrofluoric acid. In this case, however, additional processing is required in order to supply this material out of a nuclear fuel production plant as satisfactory raw material. The system therefor will be complicated. The production of hydrofluoric acid from calcium fluoride is accompanied by formation of a by-product which cannot be directly used.

This invention is directed to processing of a waste solution from a uranium nuclear fuel production plant containing ammonium fluoride and ammonia to recover fluorine material and ammonia material separately with minimum generation of waste materials, wherein the fluorine material can be recovered in the form of anhydrous hydrogen fluoride, which is a raw material for the uranium hexafluoride conversion. Further in the process of the present invention, the reagents used for the above separation can be recycled and reused after reprocessing, whereby the amount of the waste material is minimized. We, noting specific behavior of magnesium chloride, devised a combination of steps to achieve the above-mentioned object making use of the specific property of magnesium chloride and completed this invention.

DISCLOSURE OF THE INVENTION

This invention provides a closed-system recycling processing of a waste solution containing ammonium ions and fluoride ions comprising separating ammonium ions by ion exchange adsorption with a strong acid type ion exchange resin; concentrating the remaining diluted hydrogen fluoride solution by distillation if necessary; recovering hydrogen fluoride by extractive distillation with addition of concentrated sulfuric acid; concentrating the remaining diluted sulfuric acid and recycling it to said extractive distillation step; regenerating the ion exchange resin which adsorbed ammonium ions with an aqueous solution of hydrochloric acid and reusing said resin from which ammonium ions have been removed for said adsorption of ammonium ions; recovering ammonia water from the remaining aqueous solution of ammonium chloride by distilling it with addition of magnesium hydroxide; recovering hydrochloric acid and magnesium hydroxide from the remaining solution containing magnesium chloride by the hydrolytic thermal decomposition; and recycling said hydrochloric acid to said ion exchange resin regeneration step and recycling said magnesium hydroxide to said step of distilling ammonia water from the ammonium chloride solution.

The process of this invention can be applied not only to the processing of the waste solution from a uranium nuclear fuel production plant but also to the processing of any waste solution containing $NH_4^+$ and $F^-$ in general. In such a case, co-existence of small amounts of other impurity ions causes no problem. But if they are contained in large amounts, they can be removed beforehand by any suitable method.

Generally, the waste solution is first subjected to ion exchange adsorption to separate ammonium ions. A strong acid type cationic ion exchange resin is used at this step. A cationic ion exchange resin of any resin base such as polystyrene type, phenol type, graphite type, etc. can be used, if they have a strong acid radical. These ion exchange resins can be used either by passing the solution to be treated through a column filled therewith or by simply mixing it with the solution to be treated and agitating and separating thereafter. The amount of such a resin to be filled or to be mixed can be suitably varied in accordance with the concentration of $NH_4^+$ and $F^-$ in the waste solution to be treated. The strong acid type ion exchange resin can be used regardless of acidity of the waste solution to be treated, and therefore the solution can be used without necessity of adjusting its acidity.

The aqueous phase after the ion exchange is a solution containing only several percents of HF in the case of a waste solution from a uranium hexafluoride reconversion plant. From such a solution approximately 90% of the total fluorine content can be recovered as anhydrous hydrogen fluoride by distillation of the solution with addition of concentrated sulfuric acid (70% or higher) by the method known per se preferably after raising the HF content to about 30% by distillation. The waste sulfuric acid solution from this step can be converted to a concentrated sulfuric acid at the next step of distillation-concentration and it can be used in the extractive distillation step. Therefore, the water distilled and collected at the HF concentration step and the water distilled and collected at the sulfuric acid concentration step are the only waste material to be discarded. This waste water contains only small amounts of impurities such as HF, and, therefore, can be disposed of by the conventional process. The amount of solid waste materials to be discarded is extremely small in the process of this invention.

On the other hand, the ion exchange resin holding $NH_4^+$ adsorbed thereon can be reused after being regenerated to separate the $NH_4^+$. For the desorption, any mineral acid can be used. In the case of this invention, however, it must be hydrochloric acid, since recovery of ammonia is intended. Ammonia water can be recovered from the thus obtained ammonium chloride aqueous solution by simply boiling it with the addition of magnesium hydroxide. At least 0.5 mole of magnesium hydroxide per 1 mole of ammonium chloride should be added. At this step, ammonia water of a 3–20% concentration is obtained at about 97% recovery, and a magnesium chloride aqueous solution remains.

This magnesium chloride aqueous solution is thermally decomposed at the next step, wherein hydrochloric acid is distilled off and a slurry of magnesium hydroxide remains. These materials can be recycled to the previous steps as is, and they can be reused repeatedly until cationic impurities other than $NH_4^+$ accumulate in the magnesium hydroxide and recycling becomes impossible.

In conclusion, in the process provided by the completion of this invention, the waste material is only the water containing a small amount of fluorine materials produced in the sulfuric acid concentration step, ammonia water and anhydrous hydrogen fluoride are recovered in the directly reusable forms, and all the materials participating in the process are repeatedly used in the closed system of this process.

Now the invention will be specifically described with reference to the attached drawing.

BRIEF EXPLANATION OF THE ATTACHED DRAWING

The attached sole drawing is a flow chart of an embodiment of the process of this invention.

DESCRIPTION OF A SPECIFIC EMBODIMENT OF THE INVENTION

In the following description, all percentages referred to are on the basis of weight.

Ten (10) liters of a simulated waste solution containing 5% $NH_4F$ and 2% $NH_4OH$ was passed through a column filled with 2 liters of a strong acid type ion exchange resin (Amberlite IR 120, Rohm & Haas). Ammonium ions were adsorbed on the ion exchange resin, and a HF aqueous solution of about 2.7% concentration flowed out. The ion exchange resin was washed with about 6 liters of water and the effluent was combined with the previous effluent. Thus a HF solution of about 1.5% concentration was obtained.

This HF solution was distilled in the distillation column, and an about 32% aqueous solution of HF was discharged from the bottom and water (steam) was discharged from the top. The HF solution from the bottom was transferred to an extractive distillation column and was extractively distilled while 1.8 liters of 80% $H_2SO_4$ was being supplied into the column from the top. Thus about 2.5 liters of anhydrous hydrofluoric acid was obtained from the top. From the bottom, waste sulfuric acid of about 68% concentration was discharged. This waste sulfuric acid was concentrated to 80% by evaporating water in a concentration column and was recycled to the extractive distillation column. The amount of the HF that was not recovered as anhydrous hydrogen fluoride in the extractive distillation column was about 1% of the total HF, and this was discharged together with the water which was evaporated in the sulfuric acid concentration column.

The ammonia which was adsorbed on the ion exchange resin at the ion exchange step was desorbed with about 6 liters of a 3N HCl solution. The ion exchange resin from which ammonia was desorbed is reused at the ion exchange step of the next run. The effluent of the regeneration and washing was an about 4% concentration $NH_4Cl$ solution. To this, about 0.6 kg of $Mg(OH)_2$ was added and the mixture was heated and thus about 5 liters of an about 15% concentration $NH_4OH$ aqueous solution was obtained by condensing the effluent ammoniacal steam.

The remaining about 5% concentration $MgCl_2$ aqueous solution was separated into $Mg(OH)_2$ and a HCl aqueous solution by hydrolytic thermal decomposition and each material was recycled in the present process.

By repeating the above described process, 1 $m^3$ in total of the waste solution was processed. After this run, no deterioration was observed in the used ion exchange resin and the loss was less than 2%. The losses of the other used materials, that is, sulfuric acid, hydrochloric acid and magnesium hydroxide were less than 5%. The amount of the recovered hydrofluoric acid and ammonia water was respectively 21.6 l and 510 l, and the recovery was respectively 97% and 93%. The amount of produced waste water was 2.43 $m^3$ and the fluorine content thereof was 0.096 g/l.

I claim:

1. A closed-system process for recycling of a waste solution containing ammonium ions and fluoride ions comprising the steps of:

separating ammonium ions by ion exchange adsorption with a strong acid type ion exchange resin;

recovering hydrogen fluoride by extractive distillation with addition of concentrated sulfuric acid;

concentrating the remaining diluted sulfuric acid and recycling it to said extractive distillation step;

regenerating said ion exchange resin which adsorbed ammonium ions with an aqueous solution of hydrochloric acid and reusing said resin from which ammonium ions have been removed for said adsorption of ammonium ions;

recovering ammonia water from the remaining aqueous solution of ammonium chloride by distilling said aqueous solution of ammonium chloride with addition of magnesium hydroxide;

recovering hydrochloric acid and magnesium hydroxide from the remaining solution containing magnesium chloride by hydrolytic thermal decomposition of said magnesium chloride; and recycling said hydochloric acid to said ion exchange resin regeneration step and recycling said magnesium hydroxide to said step of distilling ammonia water from said ammonium chloride solution.

2. The process as set forth in claim 1, wherein the waste solution containing ammonium ions and fluoride ions is the waste water from a nuclear uranium fuel production plant.

3. The process as set forth in claim 2, further comprising concentrating by distillation the diluted hydrogen fluoride solution which remains after said separating step.

4. The process as set forth in claim 1, further comprising concentrating by distillation the diluted hydrogen fluoride solution which remains after said separating step.

* * * * *